United States Patent
Park et al.

(10) Patent No.: US 10,985,367 B2
(45) Date of Patent: Apr. 20, 2021

(54) LITHIUM COBALT COMPOSITE OXIDE FOR LITHIUM SECONDARY BATTERY AND LITHIUM SECONDARY BATTERY INCLUDING POSITIVE ELECTRODE INCLUDING THE LITHIUM COBALT COMPOSITE OXIDE

(71) Applicant: SAMSUNG SDI CO., LTD., Yongin-si (KR)

(72) Inventors: Young Jin Park, Yongin-si (KR); Chang Wook Kim, Yongin-si (KR); Eun Sung Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 156 days.

(21) Appl. No.: 15/662,725

(22) Filed: Jul. 28, 2017

(65) Prior Publication Data
US 2018/0040888 A1    Feb. 8, 2018

(30) Foreign Application Priority Data

Aug. 2, 2016   (KR) .................. 10-2016-0098447

(51) Int. Cl.
| | |
|---|---|
| *H01M 4/505* | (2010.01) |
| *H01M 4/131* | (2010.01) |
| *H01M 4/36* | (2006.01) |
| *H01M 4/485* | (2010.01) |
| *H01M 4/525* | (2010.01) |

(Continued)

(52) U.S. Cl.
CPC ........... *H01M 4/505* (2013.01); *H01M 4/131* (2013.01); *H01M 4/366* (2013.01); *H01M 4/485* (2013.01); *H01M 4/525* (2013.01); *H01M 10/0568* (2013.01); *H01M 10/0569* (2013.01); *C01G 51/42* (2013.01); *C01P 2002/52* (2013.01); *H01M 4/587* (2013.01); *H01M 10/0525* (2013.01); *H01M 2010/4292* (2013.01);

(Continued)

(58) Field of Classification Search
CPC ......... H01M 10/0525; H01M 10/0568; H01M 10/0569; H01M 2010/4292; H01M 2300/0025; H01M 2300/004; H01M 4/131; H01M 4/366; H01M 4/485; H01M 4/505; H01M 4/525; H01M 4/587
See application file for complete search history.

(56) References Cited

U.S. PATENT DOCUMENTS

| | | | |
|---|---|---|---|
| 7,608,363 | B2 | 10/2009 | Kinoshita et al. |
| 7,615,315 | B2 | 11/2009 | Tatsumi et al. |

(Continued)

FOREIGN PATENT DOCUMENTS

| | | |
|---|---|---|
| JP | 2004-079386 A | 3/2004 |
| JP | 2006-147191 A | 6/2006 |

(Continued)

OTHER PUBLICATIONS

EICSearch results from Julia Wang on Nov. 4, 2018 (Year: 2018).*

(Continued)

*Primary Examiner* — Victoria H Lynch
(74) *Attorney, Agent, or Firm* — Lee IP Law, P.C.

(57) ABSTRACT

A lithium cobalt composite oxide for a lithium secondary battery and a lithium secondary battery, the lithium cobalt composite oxide being doped with magnesium and having an atomic ratio of Mg/Co of about 0.0035:1 to about 0.01:1.

5 Claims, 5 Drawing Sheets

(51) Int. Cl.
*H01M 10/0568* (2010.01)
*H01M 10/0569* (2010.01)
*C01G 51/00* (2006.01)
*H01M 4/587* (2010.01)
*H01M 10/0525* (2010.01)
*H01M 10/42* (2006.01)

(52) U.S. Cl.
CPC ............... *H01M 2300/004* (2013.01); *H01M 2300/0025* (2013.01)

(56) References Cited

U.S. PATENT DOCUMENTS

| | | | |
|---|---|---|---|
| 9,923,244 | B2 | 3/2018 | Takanashi et al. |
| 2005/0250013 | A1 | 11/2005 | Tatsumi et al. |
| 2006/0154146 | A1 | 7/2006 | Kawasato et al. |
| 2006/0222951 | A1 | 10/2006 | Tatsumi |
| 2007/0254214 | A1 | 11/2007 | Horichi et al. |
| 2008/0076027 | A1 | 3/2008 | Saito |
| 2008/0076207 | A1 | 3/2008 | Tamano |
| 2012/0034515 | A1 | 2/2012 | Koo et al. |
| 2013/0071661 | A1 | 3/2013 | Chen et al. |
| 2013/0071747 | A1 | 3/2013 | Chen et al. |
| 2017/0018808 | A1* | 1/2017 | Takanashi ......... H01M 10/0525 |

FOREIGN PATENT DOCUMENTS

| | | |
|---|---|---|
| KR | 10-2005-0057566 A | 6/2005 |
| KR | 2006-0028408 A | 3/2006 |
| KR | 10-2010-0052419 A | 5/2010 |
| KR | 10-2014-0016730 A | 2/2014 |
| KR | 10-1419097 B1 | 7/2014 |
| WO | WO 2015136881 A | 9/2015 |
| WO | WO-2015136881 A1 * | 9/2015 ........ H01M 10/0525 |

OTHER PUBLICATIONS

EICSearch results from Brandon Burnette on Sep. 2, 2019 (Year: 2019).*
Extended European Search Report issued by the European Patent Office dated Dec. 15, 2017 in the examination of the European Patent Application No. 17 183 645.5.
Office Action issued by the European Patent Office dated Sep. 6, 2018 in the examination of the European Patent Application No. 17183645.5.
European Office action dated Sep. 19, 2019.
Cheon, et al. "Effect of Finary Conductive Agents in LiCoO2 Cathode on Performances of Lithium Ion Polymer Battery" Electrochemical Acta, vol. 46, Issue 4, (2000), pp. 599-605.
Extended European Search Report issued in EP 17 183608.3 dated Dec. 15, 2017.
Office Action issued in EP 17183608.3 dated Sep. 6, 2018.
Office Action issued in EP 17183608.3 dated Sep. 19, 2019.
Office action issued in U.S. Appl. No. 15/662,987 dated Sep. 21, 2018.
Office action issued in U.S. Appl. No. 15/662,987 dated Apr. 2, 2019.
Office action issued in U.S. Appl. No. 15/662,987 dated Jul. 29, 2018.
Office action issued in U.S. Appl. No. 15/662,987 dated Feb. 5, 2020.
Notice of Allowance issued in in U.S. Appl. No. 15/662,987 dated Apr. 20, 2020.
Korean Office Action dated Jul. 1, 2020.

* cited by examiner

LITHIUM COBALT COMPOSITE OXIDE FOR LITHIUM SECONDARY BATTERY AND LITHIUM SECONDARY BATTERY INCLUDING POSITIVE ELECTRODE INCLUDING THE LITHIUM COBALT COMPOSITE OXIDE

CROSS-REFERENCE TO RELATED APPLICATION

Korean Patent Application No. 10-2016-0098447, filed on Aug. 2, 2016, in the Korean Intellectual Property Office, and entitled: "Lithium Cobalt Composite Oxide for Lithium Secondary Battery and Lithium Secondary Battery Including Positive Electrode Including the Lithium Cobalt Composite Oxide," is incorporated by reference herein in its entirety.

BACKGROUND

1. Field

Embodiments relate to a lithium cobalt composite oxide for a lithium secondary battery and a lithium secondary battery including a positive electrode containing the lithium cobalt composite oxide.

2. Description of the Related Art

Lithium secondary batteries have drawn attention for use as power sources for small portable electronic devices. Since lithium secondary batteries contain an organic electrolyte, they have a discharge voltage of at least twice that of other batteries containing an aqueous alkali electrolyte, and thus have higher energy density.

SUMMARY

Embodiments are directed to a lithium cobalt composite oxide for a lithium secondary battery and a lithium secondary battery including a positive electrode containing the lithium cobalt composite oxide.

The embodiments may be realized by providing a lithium cobalt composite oxide for a lithium secondary battery, the lithium cobalt composite oxide being doped with magnesium and having an atomic ratio of Mg/Co of about 0.0035:1 to about 0.01:1.

An atomic ratio of a sum of atoms of Li+Mg to a sum of atoms of Co+M in the lithium cobalt composite oxide may be 1.00:1 or lower, wherein M is a metal other than Mg.

An atomic ratio of a sum of atoms of Li+Mg to a sum of atoms of Co+M in the lithium cobalt composite oxide may be about 0.96:1 to 1.00:1, wherein M is a metal other than Mg.

The lithium cobalt composite oxide may be a compound represented by Formula 1:

$$Li_{1-x}Mg_xCo_{1-y}M_yO_2 \qquad \text{[Formula 1]}$$

wherein, in Formula 1, $0<x<0.04$ and $0\leq y<0.02$; and M may be a Group 3 to Group 13 metal other than Mg.

In Formula 1, M may be titanium (Ti), vanadium (V), nickel (Ni), iron (Fe), niobium (Nb), molybdenum (Mo), aluminum (Al), zirconium (Zr), or manganese (Mn).

In Formula 1, $0.001 \leq x \leq 0.01$.

The lithium cobalt composite oxide may be $Li_{0.9925}Mg_{0.0075}CoO_2$, $Li_{0.995}Mg_{0.005}CoO_2$, $Li_{0.99325}Mg_{0.00625}CoO_2$, $Li_{0.99}Mg_{0.01}CoO_2$, $Li_{0.99625}Mg_{0.00375}CoO_2$, or $Li_{0.99}Mg_{0.01}CoO_2$.

The atomic ratio of Mg/Co of the lithium cobalt composite oxide may be about 0.005:1 to about 0.01:1.

The atomic ratio of Mg/Co of the lithium cobalt composite oxide may be about 0.005:1 to about 0.0075:1.

The embodiments may be realized by providing a lithium secondary battery comprising a positive electrode that includes a lithium cobalt composite oxide, the lithium cobalt composite oxide being doped with magnesium and having an atomic ratio of Mg/Co of about 0.0035:1 to about 0.01:1.

A charging voltage of the lithium secondary battery may be 4.5 V or higher.

An atomic ratio of a sum of atoms of Li+Mg to a sum of atoms of Co+M in the lithium cobalt composite oxide may be 1.00:1 or lower, wherein M is a metal other than Mg.

An atomic ratio of a sum of atoms of Li+Mg to a sum of atoms of Co+M in the lithium cobalt composite oxide may be about 0.96:1 to 1.00:1, wherein M is a metal other than Mg.

The lithium cobalt composite oxide may be a compound represented by Formula 1:

$$Li_{1-x}Mg_xCo_{1-y}M_yO_2 \qquad \text{[Formula 1]}$$

wherein, in Formula 1, $0<x<0.04$ and $0\leq y<0.02$; and M may be a Group 3 to Group 13 metal other than Mg.

In Formula 1, M may be titanium (Ti), vanadium (V), nickel (Ni), iron (Fe), niobium (Nb), molybdenum (Mo), aluminum (Al), zirconium (Zr), or manganese (Mn).

In Formula 1, $0.001 \leq x \leq 0.01$.

The lithium cobalt composite oxide may be $Li_{0.9925}Mg_{0.0075}CoO_2$, $Li_{0.995}Mg_{0.005}CoO_2$, $Li_{0.99325}Mg_{0.00625}CoO_2$, $Li_{0.99}Mg_{0.01}CoO_2$, $Li_{0.99625}Mg_{0.00375}CoO_2$, or $Li_{0.99}Mg_{0.01}CoO_2$.

The atomic ratio of Mg/Co of the lithium cobalt composite oxide may be about 0.005:1 to about 0.01:1.

The atomic ratio of Mg/Co of the lithium cobalt composite oxide may be about 0.005:1 to about 0.0075:1.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
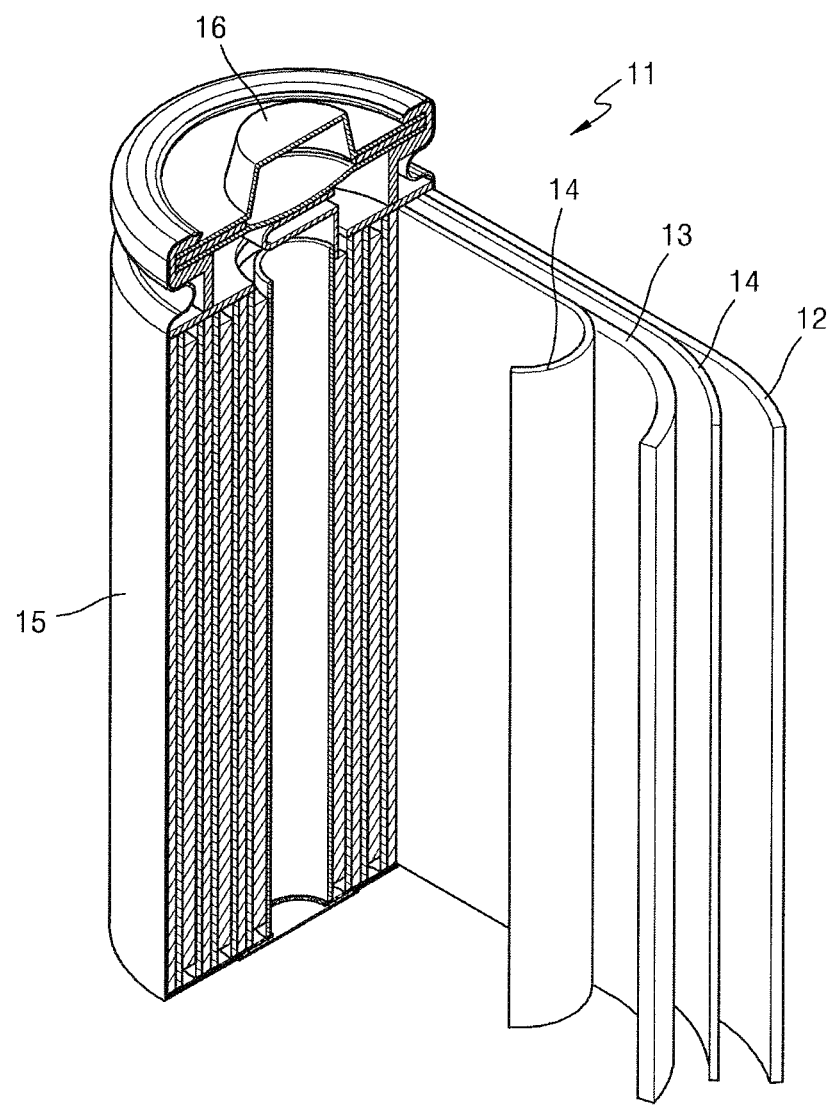
FIG. 1 illustrates an exploded perspective view of a battery according to an embodiment.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

Hereinafter, according to one or more embodiments, a lithium cobalt composite oxide and a lithium secondary battery including a positive electrode including the lithium cobalt composite oxide will be described in detail.

When lithium cobalt oxide ($LiCoO_2$) is used as a positive electrode active material, a phase transition, $O_3 \rightarrow H_{1-3} \rightarrow O_1$, may occur at a high voltage region. If, after the phase transition has occurred, the lithium cobalt oxide were to be used as a positive electrode active material, cell performance of the lithium secondary battery could deteriorate.

According to an embodiment, the $O_3 \rightarrow H_{1-3} \rightarrow O_1$ transition phase (that occurs at a high voltage region) may be effectively suppressed by controlling an atomic ratio of Mg/Co within a range of about 0.0035 to about 0.01 (e.g., about 0.0035:1 to about 0.01:1) by doping the lithium cobalt composite oxide with Mg. As a result, when the lithium cobalt composite oxide is used, stability of the battery may improve at a high voltage, which may help increase a charge/discharge capacity, and thereby improve lifespan characteristics of the lithium secondary battery at a high voltage. The high voltage region may be, e.g., in a range of about 4.55 V to about 4.63 V.

In an implementation, the atomic ratio of Mg/Co may be, e.g., in a range of about 0.005:1 to about 0.01:1.

In an implementation, an atomic ratio of (a sum total atoms of Li+Mg)/(a sum total atoms of Co+M) (where M is a metal other than Mg) may be about 1.00:1 or less, or, e.g., in a range of about 0.96:1 to about 1.00:1, for example, in a range of about 0.98:1 to about 1.00:1, for example about 1.00:1. When the atomic ratio of (total of Li+Mg)/(Co+M) (where M is a metal other than Mg) is within this range, a lithium cobalt composite oxide having an excellent phase transition-suppressing effect at a high voltage may be obtained.

In an implementation, the lithium cobalt composite oxide may be a compound represented by Formula 1.

$Li_{1-x}Mg_xCo_{1-y}M_yO_2$ [Formula 1]

In Formula 1, 0<x<0.04 and 0≤y<0.02, and M may be a metal other than Mg. For example, M may be a metal selected from Group 3 to Group 13 elements.

In Formula 1, M may be a metal other than Mg, e.g., titanium (Ti), vanadium (V), nickel (Ni), iron (Fe), niobium (Nb), molybdenum (Mo), aluminum (Al), zirconium (Zr), or manganese (Mn).

The lithium cobalt composite oxide represented by Formula 1 according to an embodiment may contain magnesium at an amount of less than 4 mol % and may have magnesium doped in a lithium site. When the amount of magnesium is 4 mol % or greater, magnesium may be doped in a cobalt site.

In Formula 1, x may be in a range of about 0.001 to about 0.01, or, e.g., about 0.005 to about 0.01, or, e.g., may be 0.005, 0.00625, 0.0075, or 0.01.

The lithium cobalt composite oxide according to an embodiment may be, e.g., $Li_{0.9925}Mg_{0.0075}CoO_2$, $Li_{0.995}Mg_{0.005}CoO_2$, $Li_{0.99325}Mg_{0.00625}CoO_2$, $Li_{0.99}Mg_{0.01}CoO_2$, $Li_{0.99625}Mg_{0.00375}CoO_2$, or $Li_{0.99}Mg_{0.01}CoO_2$.

In an implementation, the atomic ratio of Mg/Co of the lithium cobalt composite oxide may be about 0.005:1 to about 0.0075:1.

The lithium cobalt composite oxide represented by Formula 1 according to an embodiment may have magnesium ions in a space within a lithium layer. Thus, even when all lithium ions escape the lithium layer at the high voltage range, an $O_3$ structure, which is a form of the lithium cobalt composite oxide, may be stabilized.

In an implementation, the lithium cobalt composite oxide according to an embodiment may be further doped with at least one selected from titanium, aluminum, manganese, zirconium, sodium, potassium, calcium, and zinc.

Hereinafter, a method of preparing the lithium cobalt composite oxide according to another embodiment will be described.

First, a lithium precursor, a cobalt precursor, a magnesium precursor, and a metal (M) precursor may be mixed at a predetermined molar ratio to obtain a precursor mixture. Here, a mixing ratio of the lithium precursor, cobalt precursor, magnesium precursor, and metal (M) precursor may be stoichiometrically controlled to obtain the desired lithium cobalt composite oxide.

The mixing may be dry mixing such as mechanical mixing using, e.g., a ball mill, a Banbury mixer, or a homogenizer. In the mechanical mixing, a zirconia ball may be used. A period of time for the mechanical mixing may vary, but, e.g., may be about 20 minutes to about 10 hours, for example, about 30 minutes to about 3 hours.

The use of dry mixing may help reduce manufacturing costs as compared with using wet mixing.

Wet mixing may be performed by adding an alcohol solvent such as ethanol during the mechanical mixing to increase mixing efficiency of the precursor mixture. An amount of the solvent may be about 100 parts to about 3000 parts by weight based on 100 parts by weight of the total amount of the precursors. When the amount of the solvent is within this range, the precursors in the mixture may be mixed homogenously. A heat-treatment time may vary depending on a heat-treatment temperature, e.g., the heat-treatment time may be about 3 hours to about 20 hours.

The lithium cobalt composite oxide according to an embodiment may be prepared by using a suitable manufacturing method such as spray pyrolysis in addition to a solid state reaction.

The mixture may be heat-treated under an air or oxygen atmosphere to obtain a lithium cobalt composite oxide.

In an implementation, the heat-treatment may be performed under an air or oxygen atmosphere at a temperature of about 400° C. to about 1,200° C. or, e.g., about 900° C. to about 1,100° C. Here, the oxygen atmosphere may be formed by using oxygen alone or oxygen, nitrogen, and an inert gas.

The heat-treatment time may vary depending on the heat-treatment temperature. For example, the heat-treatment may be performed for about 5 hours to about 20 hours.

The lithium precursor, the cobalt precursor, and the magnesium precursor may be a suitable material.

Examples of the lithium precursor may include lithium hydroxide (LiOH), lithium carbonate ($Li_2CO_3$), lithium sulfate ($Li_2SO_4$), and lithium nitrate ($LiNO_3$).

Examples of the cobalt precursor may include cobalt carbonate, cobalt hydroxide, cobalt chloride, cobalt sulfate, and cobalt nitrate. Examples of the magnesium precursor may include magnesium chloride, magnesium carbonate, magnesium hydroxide, magnesium sulfate, and magnesium nitrate.

Examples of the metal precursor may include metal hydroxide, metal carbonate, metal sulfate, and metal nitrate.

The lithium cobalt composite oxide obtained by using the above-described method may have a specific surface area of about 0.1 $m^2/g$ to about 3 $m^2/g$ (e.g. the surface are may be measured by a BET method) and an average particle diameter (e.g. an average particle diameter D50) of about 1 μm to about 20 μm (e.g. the average particle diameter (D50) may be measured with an average particle size analyzer under a dynamic light scattering procedure).

According to another aspect, a lithium secondary battery may include a positive electrode including the lithium cobalt composite oxide.

First, a positive electrode is prepared in the following manner.

The lithium cobalt composite oxide as a positive electrode active material, a binder, and a solvent may be mixed to prepare a positive electrode active material composition.

In an implementation, the positive electrode active material composition may further include a conducting agent.

In an implementation, the positive electrode active material composition may be directly coated on a metallic current collector to prepare a positive electrode. In an implementation, the positive electrode active material composition may be cast on a separate support to form a positive electrode active material film, which may then be separated from the support and laminated on a metallic current collector to prepare a positive electrode plate.

In the manufacturing of the positive electrode, the positive electrode active material composition may further include a first positive electrode active material that is suitably used in a lithium secondary battery.

The first positive electrode active material may be at least one selected from a lithium cobalt oxide, a lithium nickel cobalt manganese oxide, a lithium nickel cobalt aluminum oxide, a lithium iron phosphate, and a lithium manganese oxide, or a suitable material available as a positive electrode active material may be used.

In an implementation, the first positive electrode active material may be a compound represented by one of the following formulae.

$Li_aA_{1-b}B'_bD'_2$ (where 0.90≤a≤1.8, and 0≤b≤0.5); $Li_aE_{1-b}B'_bO_{2-c}D'_c$ (where 0.90≤a≤1.8, 0≤b≤0.5, and 0≤c≤0.05); $LiE_{2-b}B'_bO_{4-c}D'_c$ (where 0≤b≤0.5, and 0≤c≤0.05); $Li_aNi_{1-b-c}Co_bB'_cD'_\alpha$ (where 0.90≤a≤1.8, 0≤b≤0.5, 0≤c≤0.05, and 0<α≤2); $Li_aNi_{1-b-c}Co_bB'_cO_{2-\alpha}F'_\alpha$ (where 0.90≤a≤1.8, 0≤b≤0.5, 0≤c≤0.05, and 0<α<2); $Li_aNi_{1-b-c}Co_bB'_cO_{2-\alpha}F'_2$ (where 0.90≤a≤1.8, 0≤b≤0.5, 0≤c≤0.05, and 0<α<2); $Li_aNi_{1-b-c}Mn_bB'_cD'_\alpha$ (where 0.90≤a≤1.8, 0≤b≤0.5, 0≤c≤0.05, and 0<α≤2); $Li_aNi_{1-b-c}Mn_bB^1_cO_{2-\alpha}F^1_\alpha$ (where 0.90≤a≤1.8, 0≤b≤0.5, 0≤c≤0.05, and 0<α<2); $Li_aNi_{1-b-c}Mn_bB'_cO_{2-\alpha}F'_2$ (where 0.90≤a≤1.8, 0≤b≤0.5, 0≤c≤0.05, and 0<α<2); $Li_aN_{ib}E_cG_dO_2$ (where 0.90≤a≤1.8, 0≤b≤0.9, 0≤c≤0.5, and 0.001≤d≤0.1.); $Li_aNi_bCo_cMn_dGeO_2$ (where 0.90≤a≤1.8, 0≤b≤0.9, 0≤c≤0.5, 0≤d≤0.5, and 0.001≤e≤0.1.); $Li_aNiG_bO_2$ (where 0.90≤a≤1.8, and 0.001≤b≤0.1.); $Li_aCoG_bO_2$ (where 0.90≤a≤1.8, and 0.001≤b≤0.1.); $Li_aMnG_bO_2$ (where 0.90≤a≤1.8, and 0.001≤b≤0.1.); $Li_aMn_2G_bO_4$ (where 0.90≤a≤1.8, and 0.001≤b≤0.1.); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where 0≤f≤2); $Li_{(3-f)}Fe_2(PO_4)_3$ (where 0≤f≤2); and $LiFePO_4$.

In the formulae above, A may be selected from nickel (Ni), cobalt (Co), manganese (Mn), and combinations thereof; B' may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D' may be selected from oxygen (O), fluorine (F), sulfur (S), phosphorus (P), and combinations thereof; E may be selected from cobalt (Co), manganese (Mn), and combinations thereof; F' may be selected from fluorine (F), sulfur (S), phosphorus (P), and combinations thereof; G may be selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; I' is selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof.

In the positive electrode active material composition, examples of the binder may include polyamideimide, polyacrylic acid (PAA), polyfluorovinylidene, polyvinylalcohol, carboxymethylcellulose (CMC), starch, hydroxypropyl cellulose, regenerated cellulose, polyvinylpyrrolidone, tetrafluoroethylene, polyethylene, polypropylene, lithium polyacrylate, lithium polymethacrylate, ethylene-propylenediene monomer (EPDM), sulfonated EPDM, styrene butadiene rubber, fluoro rubber, and various copolymers.

For example, the conducting agent may include at least one carbonaceous conducting agent selected from carbon black, carbon fibers, and graphite. The carbon black may be, for example, selected from acetylene black, Ketjen black, super P, channel black, furnace black, lamp black, and summer black.

The graphite may be natural graphite or artificial graphite.

Examples of the solvent may include N-methyl-pyrrolidone, butanol, acetonitrile, acetone, methanol, ethanol, and N-methyl-2-pyrrolidone (NMP), or a suitable material available as a solvent may be used.

In an implementation, a plasticizer may be added to the positive electrode active material composition and/or negative electrode active material composition to help form pores in the electrode plate.

The amounts of the positive electrode active material, the conducting agent, the binder, and the solvent may be the same levels suitably used for lithium secondary batteries. In an implementation, at least one of the conducting agent, the binder, and the solvent may be omitted according to the use and the structure of the lithium secondary battery.

A negative electrode may be prepared by using the same method used in preparation of the positive electrode except that a negative electrode active material is used instead of the positive electrode active material.

Examples of the negative electrode active material may include a carbonaceous material, silicon, a silicon oxide, a silicon-based alloy, a silicon-carbonaceous material composite, tin, a tin-based alloy, a tin-carbon composite, a metal oxide, or a combination thereof.

Examples of the carbonaceous material may include crystalline carbon, amorphous carbon, and mixtures thereof. Examples of the crystalline carbon may include graphite, such as natural graphite or artificial graphite in shapeless, plate, flake, spherical, or fibrous form. Examples of the amorphous carbon may include soft carbon (carbon sintered at low temperatures), hard carbon, meso-phase pitch carbides, sintered cokes, graphene, carbon black, fullerene soot, carbon nanotubes, and carbon fibers, or a suitable material available as a carbonaceous material may be used.

The negative electrode active material may be selected from Si, SiOx (where $0<x<2$, for example, x is in a range of about 0.5 to about 1.5), Sn, $SnO_2$, a silicon-containing metal alloy, and a mixture thereof. A metal capable of forming the silicon-containing metal alloy may include at least one selected from Al, Sn, Ag, Fe, Bi, Mg, Zn, in, Ge, Pb, and Ti.

The negative electrode active material may include a metal/semi-metal that is alloyable with lithium, an alloy thereof, or an oxide thereof. Examples of the metal/semi-metal alloyable with lithium may include Si, Sn, Al, Ge, Pb, Bi, Sb, a Si—Y' alloy (where Y' is an alkali metal, an alkali earth metal, a Group XIII element, a Group XIV element, a transition metal, a rare earth element, or a combination thereof, and Y' is not Si), a Sn—Y' alloy (where Y' is an alkali metal, an alkali earth metal, a Group XIII element, a Group XIV element, a transition metal, a rare earth element, or a combination thereof, and Y' is not Sn), and MnOx (where $0<x\leq2$). In some example embodiments, Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), geranium (Ge), phosphorus (P), arsenic (As), antimony (Sb), bismuth (Bi), sulfur (S), selenium (Se), tellurium (Te), polonium (Po), or combinations thereof. Examples of the oxide of the metal/semi-metal that is alloyable with lithium may include a lithium titanium oxide, a vanadium oxide, a lithium vanadium oxide, $SnO_2$, and $SiO_x$ (where $0<x<2$).

For example, the negative electrode active material may include at least one element selected from a Group XIII element, a Group XIV element, and a Group XV element.

For example, the negative electrode active material may include at least one element selected from Si, Ge, and Sn.

In some example embodiments, the conducting agent, the binder, and the solvent used for the negative electrode active material composition may be the same as those used for the positive electrode active material composition. The amounts of the negative electrode active material, the conducting agent, the binder, and the solvent may be the same levels suitably used in the art for lithium batteries.

Next, a separator may be disposed between the positive electrode and the negative electrode, and an insulating thin film having high ion permeability and mechanical strength is used as the separator.

The separator may have, e.g., a pore diameter of about 0.01 µm to about 10 µm and a thickness of about 5 µm to about 20 µm. The separator may be sheet or non-woven fabric including an olefin-based polymer such as polypropylene, glass fibers, or polyethylene. When a solid polymer electrolyte is used as an electrolyte, the solid polymer electrolyte may also serve as a separator.

Examples of the olefin-based polymer as a material for forming the separator may include polyethylene, polypropylene, polyvinylidene, fluoride, or a multi-layer film having two or more layers including thereof. The separator may be a mixed multi-layer such as a two-layer separator of polyethylene/polypropylene, a three-layer separator of polyethylene/polypropylene/polyethylene, or a three-layer separator of polypropylene/polyethylene/polypropylene.

A lithium salt-containing non-aqueous electrolyte includes a non-aqueous electrolyte and a lithium salt.

Examples of the non-aqueous electrolyte may include a non-aqueous electrolyte solution, an organic solid electrolyte, and an inorganic solid electrolyte.

The non-aqueous electrolyte solution may include an organic solvent. A suitable organic solvent may be used as the organic solvent in the non-aqueous electrolyte solution. Examples of the organic solvent may include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, fluoroethylene carbonate, benzonitrile, acetonitrile, tetrahydrofuran, 2-methyltetrahydrofuran, γ-butyrolactone, dioxolane, 4-methyldioxolane, N,N-dimethylformamide, N,N-dimethylacetamide, N,N-dimethylsulfoxide, dioxane, 1,2-dimethoxyethane, sulfolane, dichloroethane, chlorobenzene, nitrobenzene, diethyleneglycol, dimethylether, and a mixture thereof.

Examples of the organic solid electrolyte may include a polyethylene derivative, a polyethylene oxide derivative, a polypropylene oxide derivative, a phosphate ester polymer, polyester sulfide, polyvinyl alcohol, and polyvinylidene fluoride.

Examples of the inorganic solid electrolyte may include $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be a material that easily dissolves in the non-aqueous electrolyte, and examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (where, each of x and y is a natural number), LiCl, LiI, and a mixture thereof. In an implementation, to help improve the charging/discharging characteristics and flame retardancy, the non-aqueous electrolyte may further include, e.g., pyridine, triethylphosphate, triethanolamine, cyclic ether, ethylenediamine, n-glyme, hexamethyl phosphoamide, a nitrobenzene derivative, sulfur, quinone imine dye, N-substituted oxazolidinone, N,N-substituted imidazolidine, ethyleneglycol dialkylether, ammonium salt, pyrrole, 2-methoxy ethanol, or aluminum trichloride. In an implementation, the non-aqueous electrolyte may further include a halogen-containing solvent such as carbon tetrachloride or ethylene trifluoride to provide non-flammability.

As shown in FIG. 1, a lithium battery 11 may include a positive electrode 13, a negative electrode 12, and a separator 14. The positive electrode 13, the negative electrode 12, and the separator 14 may be wound or folded, and then accommodated in a battery case 15. Then, the battery case 15 may be filled with an organic electrolyte solution and sealed with a cap assembly 16, thereby completing the manufacture of the lithium battery 11. The battery case 15 may be of, e.g., a cylindrical type, a rectangular type, or a thin-film type battery case.

The separator 14 may be disposed between the positive electrode 13 and the negative electrode 12 to form a battery assembly. In an implementation, the battery assembly may be stacked in a bi-cell structure and impregnated with the organic electrolyte solution. The resultant may be put into a pouch and sealed, thereby completing the manufacture of a lithium ion polymer battery.

In an implementation, a plurality of battery assemblies may be stacked in series to form a battery pack, which may be used in a device that requires high capacity and high output, e.g., in a laptop computer, a smart phone, an electric tool, and an electric vehicle.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

A lithium carbonate as a lithium precursor, a cobalt oxide as a cobalt precursor, and a magnesium carbonate as a magnesium precursor were mixed by a dry method in a Henschel mixer for about 3 minutes to obtain a mixture having Li, Co, and Mg at a molar ratio of 0.9925:1.00:0.0075. The mixture was about heat-treated in the air at a temperature of about 1,000° C. for about 10 hours to obtain a heat-treated product. The heat-treated product was pulverized and classified to obtain a lithium cobalt-based composite oxide ($Li_{0.9925}Mg_{0.0075}CoO_2$) as a positive electrode active material.

Example 2

A lithium cobalt-based composite oxide ($Li_{0.995}Mg_{0.005}CoO_2$) was obtained in the same manner as in Example 1, except that a mixing ratio of the Li precursor, Co precursor, and Mg precursor was changed so that a molar ratio of Li:Co:Mg was 0.995:1.00:0.005.

Example 3

A lithium cobalt-based composite oxide ($Li_{0.99325}Mg_{0.00625}CoO_2$) was obtained in the same manner as in Example 1, except that a mixing ratio of the Li precursor, Co precursor, and Mg precursor was changed so that a molar ratio of Li:Co:Mg was 0.99325:1.00:0.00625.

Example 4

A lithium cobalt-based composite oxide ($Li_{0.99}Mg_{0.01}CoO_2$) was obtained in the same manner as in Example 1, except that a mixing ratio of the Li precursor, Co precursor, and Mg precursor was changed so that a molar ratio of Li:Co:Mg was 0.99:1:0.01.

Example 5

A lithium carbonate as a lithium precursor, a cobalt oxide as a cobalt precursor, and a magnesium carbonate as a magnesium precursor were mixed by a dry method in a Henschel mixer for about 3 minutes to obtain a mixture having Li, Co, and Mg at a molar ratio of 0.99625:1.00: 0.00375. The mixture was about heat-treated in the air at a temperature of about 1,000° C. for about 10 hours to obtain a heat-treated product. The heat-treated product was pulverized and classified to obtain a lithium cobalt-based composite oxide ($Li_{0.99625}Mg_{0.00375}CoO_2$).

Comparative Example 1

Lithium cobalt oxide ($LiCoO_2$) was used.

Comparative Example 2

A lithium carbonate as a lithium precursor, a cobalt oxide as a cobalt precursor, and a magnesium carbonate as a magnesium precursor were mixed by a dry method in a Henschel mixer for about 3 minutes to obtain a mixture having Li, Co, and Mg at a molar ratio of 0.96:1.00:0.04. The mixture was about heat-treated in the air at a temperature of about 1,000° C. for about 10 hours to obtain a heat-treated product. The heat-treated product was pulverized and classified to obtain a lithium cobalt-based composite oxide ($LiCo_{0.96}Mg_{0.04}O_2$).

The positive electrode active material obtained in Comparative Example 2 was used to obtain a lithium cobalt composite oxide doped with magnesium in a cobalt site.

Comparative Example 3

A lithium carbonate as a lithium precursor, a cobalt oxide as a cobalt precursor, and a magnesium carbonate as a magnesium precursor were mixed by a dry method in a Henschel mixer for about 3 minutes to obtain a mixture having Li, Co, and Mg at a molar ratio of 0.98:1.00:0.02. The mixture was about heat-treated in the air at a temperature of about 1,000° C. for about 10 hours to obtain a heat-treated product. The heat-treated product was pulverized and classified to obtain a lithium cobalt-based composite oxide ($Li_{0.98}Mg_{0.02}CoO_2$).

Comparative Example 4

A lithium carbonate as a lithium precursor, a cobalt oxide as a cobalt precursor, and a magnesium carbonate as a magnesium precursor were mixed by a dry method in a Henschel mixer for about 3 minutes to obtain a mixture having Li, Co, and Mg at a molar ratio of 0.97:1.00:0.03. The mixture was about heat-treated in the air at a temperature of about 1,000° C. for about 10 hours to obtain a heat-treated product. The heat-treated product was pulverized and classified to obtain a lithium cobalt-based composite oxide ($Li_{0.97}Mg_{0.03}CoO_2$).

Comparative Example 5

A lithium carbonate as a lithium precursor, a cobalt oxide as a cobalt precursor, and a magnesium carbonate as a magnesium precursor were mixed by a dry method in a Henschel mixer for about 3 minutes to obtain a mixture having Li, Co, and Mg at a molar ratio of 0.9975:1.00:0.025. The mixture was about heat-treated in the air at a temperature of about 1,000° C. for about 10 hours to obtain a heat-treated product. The heat-treated product was pulverized and classified to obtain a lithium cobalt-based composite oxide ($Li_{0.9975}Mg_{00025}CoO_2$).

Comparative Example 6

A lithium carbonate as a lithium precursor, a cobalt oxide as a cobalt precursor, and a magnesium carbonate as a magnesium precursor were mixed by a dry method in a Henschel mixer for about 3 minutes to obtain a mixture having Li, Co, and Mg at a molar ratio of 0.95:1.00:0.05. The mixture was about heat-treated in the air at a temperature of about 1,000° C. for about 10 hours to obtain a heat-treated product. The heat-treated product was pulverized and classified to obtain a lithium cobalt-based composite oxide ($Li_{0.95}Mg_{0.05}CoO_2$).

Manufacturing Example 1: Preparation of Lithium Secondary Battery (Coin Half-Cell)

A coin half-cell using the positive electrode active material prepared in Example 1 was manufactured as follows.

The positive electrode active material prepared in Example 1, polyvinylideneflouride, and carbon black as a conducting agent were mixed by using a mixer to prepare a mixture, air bubbles were removed from the mixture, and thus a slurry for forming a positive electrode active material layer having the mixture homogenously dispersed therein was prepared. The mixture was prepared by using N-methylpyrrolidone as a solvent, and a mixing ratio of the composite positive electrode active material, PVDF, and carbon black was 92:4:4 by weight.

The slurry thus prepared was coated on an aluminum thin film by using a doctor blade in the form of a thin electrode plate, and the electrode plate was dried at 135° C. for 3 hours or more, roll-pressed, and vacuum dried to prepare a positive electrode.

A lithium metal electrode was used as a counter electrode of the positive electrode to prepare a 2032 type coin half-cell. A separator (having a thickness of about 16 μm) formed of a porous polyethylene (PE) film was disposed between the positive electrode and the lithium metal electrode, and then an electrolyte solution was injected thereto to prepare a coin half-cell. The electrolyte solution was a 1.1 M solution of $LiPF_6$ dissolved in a solvent including ethylene carbonate (EC), ethylmethyl carbonate (EMC), and dimethylcarbonate (DMC) at a volume ratio of 3:4:3.

Manufacturing Examples 2 to 5: Preparation of Coin Half-Cells

Coin half-cells were prepared in the same manner as used in Manufacturing Example 1, except that the positive electrode active materials prepared in Examples 2 to 5 were each used respectively for Manufacturing Examples 2 to 5 instead of the positive electrode active material prepared in Example 1.

Comparative Manufacturing Examples 1 to 6: Preparation of Coin Half-Cells

Coin half-cells were prepared in the same manner as used in Manufacturing Example 1, except that the positive electrode active materials prepared in Comparative Examples 1 to 6 were each used respectively in Comparative Manufacturing Examples 1 to 6 instead of the positive electrode active material prepared in Example 1.

Evaluation Example 1: Differential Capacity Curve (dQ/dV)

Each of the lithium secondary batteries prepared in Manufacturing Examples 1 to 3 and 5 and Comparative Manufacturing Examples 1 and 5 was charged at 25° C. with a constant current at a 0.1 C rate until a voltage reached 4.60 V. Then, the battery was discharged with a constant current at a 0.1 C rate until a voltage reached 3.00 V (vs. Li) (a formation process, $1^{st}$ cycle).

Subsequently, after the formation process, the battery was charged at 25° C. with a constant current at a 0.2 C rate until a voltage reached 4.60 V. Next, the battery was discharged with a constant current at a 0.2 C rate until a voltage reached 3.00 V (vs. Li) to compare the dQ/dV profiles. Capacity differential characteristics of the lithium secondary batteries were evaluated after the charge/discharge cycles were completed, and the results are shown in FIG. 2.

Figure 2:
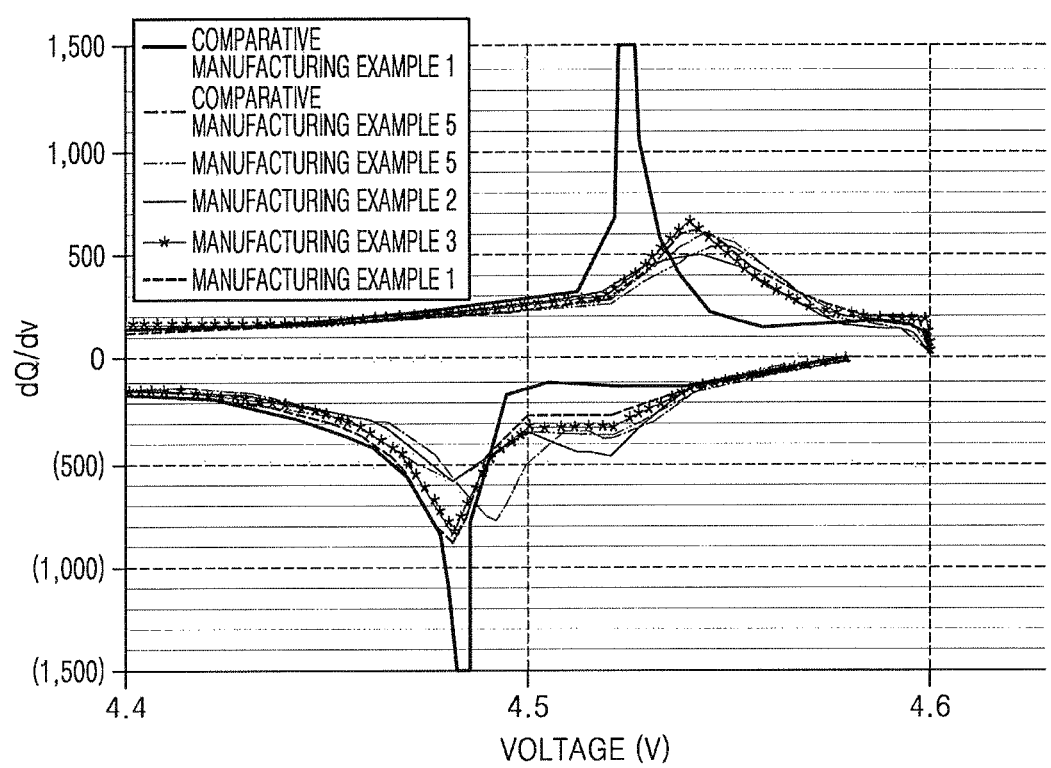
FIG. 2 illustrates a differential capacity curve of each lithium secondary battery prepared in Manufacturing Examples 1 to 3 and 5 and Comparative Manufacturing Examples 1 and 5.

Referring to FIG. 2, the lithium secondary batteries prepared in Manufacturing Examples 1 to 3 and 5 showed decreased intensities at peaks exhibiting the $O_3 \rightarrow H_{1-3} > O_1$ phase transition characteristics compared to those of the battery prepared in Comparative Manufacturing Example 1. Also, the lithium secondary batteries prepared in Manufacturing Examples 1 to 3 and 5 showed improved irreversibility of the $O_3 \rightarrow H_{1-3} > O_1$ phase transition during the discharging process. Also, it may be seen that the optimum phase transition characteristics were observed when an amount of magnesium is 0.5 mol % (Manufacturing Example 2).

Evaluation Example 2: Charge/Discharge Characteristics

1) Manufacturing Examples 1 to 5 and Comparative Manufacturing Examples 1, 3, and 5

Charge/discharge characteristics of the coin half-cells prepared in Manufacturing Examples 1 to 5 and Comparative Manufacturing Examples 1 to 5 were evaluated using a charger/discharger.

First charging/discharging was performed by charging each of the cells with a constant current at a 0.1 C rate until a voltage reached 4.6 V. When the charging was completed, the cell was rested for 10 minutes and then discharged with a constant current at a 0.1 C rate until a voltage reached 3 V. In the second charge/discharge cycle, the cell was charged with a constant current at a 0.2 C rate until a voltage reached 4.6 V. When the charging was completed, the cell was rested for 10 minutes and then discharged with a constant current at a 0.2 C rate until a voltage reached 3 V.

Figure 3:
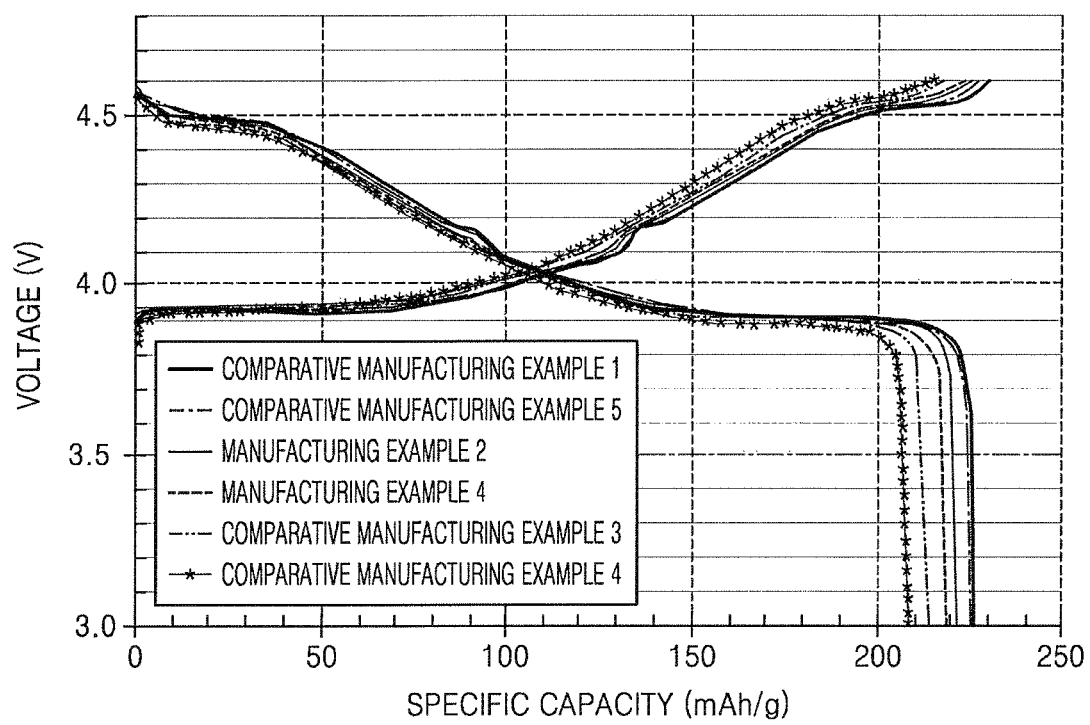
FIG. 3 illustrates voltage characteristics of each coin half-cell prepared in Manufacturing Examples 2 and 4 and Comparative Manufacturing Examples 1, 3, and 5 according to a specific capacity.
Figure 4:
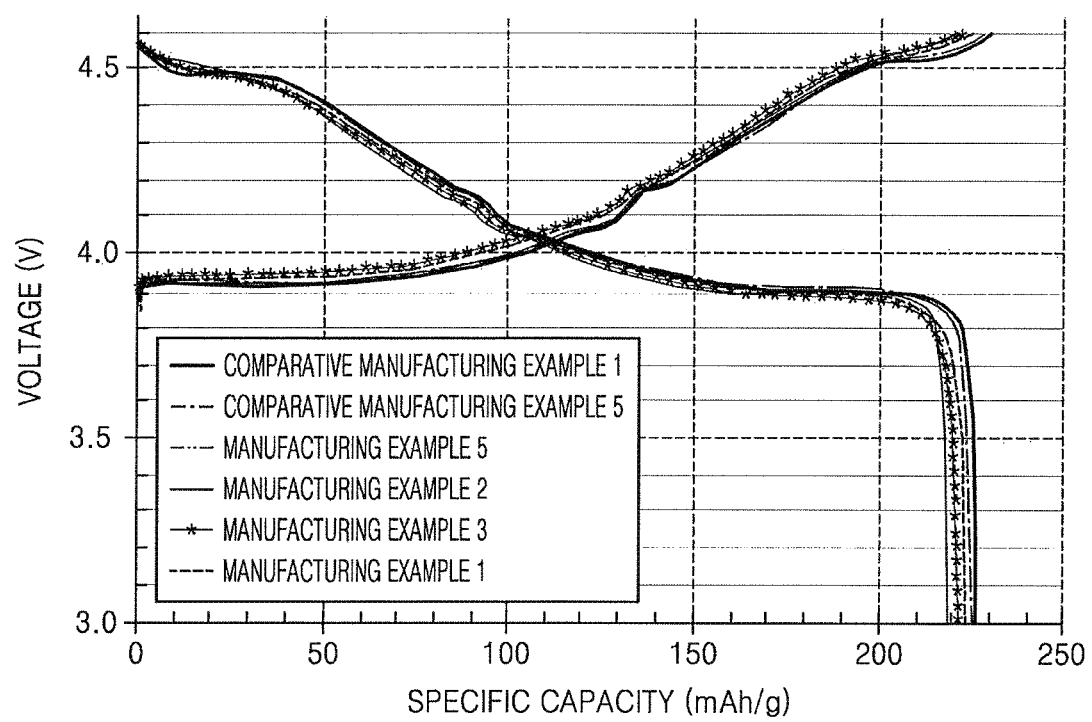
FIG. 4 illustrates voltage characteristics of each coin half-cell prepared in Manufacturing Examples 1 to 3, and 5 and Comparative Manufacturing Examples 1 and 5 according to a specific capacity.

Voltage change according to a specific capacity among the charge/discharge characteristics evaluation is shown in FIGS. 3 and 4. FIG. 3 illustrates voltage characteristics of each coin half-cell prepared in Manufacturing Examples 2 and 4 and Comparative Manufacturing Examples 1, 3, and 5 according to a specific capacity, and FIG. 4 illustrates voltage characteristics of each coin half-cell prepared in Manufacturing Examples 1 to 3, and 5 and Comparative Manufacturing Examples 1 and 5 according to a specific capacity;

As shown in FIGS. 3 and 4, it may be seen that when a Mg-doping amount increased, a specific capacity decreased.

Evaluation Example 3: Cycle Characteristics

1) Manufacturing Examples 1 to 5 and Comparative Manufacturing Examples 3 to 5

Charge/discharge characteristics of the coin half-cells prepared in Manufacturing Examples 1 to 5 and Comparative Manufacturing Examples 1, 3 to 5 were evaluated by using a charger/discharger.

First charging/discharging was performed by charging each of the cells with a constant current at a 0.1 C rate until a voltage reached 4.6 V. When the charging was completed, the cell was rested for 10 minutes and then discharged with a constant current at a 0.1 C rate until a voltage reached 3 V. In the second charge/discharge cycle, the cell was charged with a constant current at a 0.2 C rate until a voltage reached 4.3 V. When the charging was completed, the cell was rested for 10 minutes and then discharged with a constant current at a 0.2 C rate until a voltage reached 3 V.

Lifespan evaluation was performed by charging each of the cells with a constant current at a 1 C rate until a voltage reached 4.6 V. When the charging was completed, the cell was rested for 10 minutes and then discharged with a constant current at a 1 C rate until a voltage reached 3 V. The cell underwent 50 cycles of charging/discharging.

Figure 5:
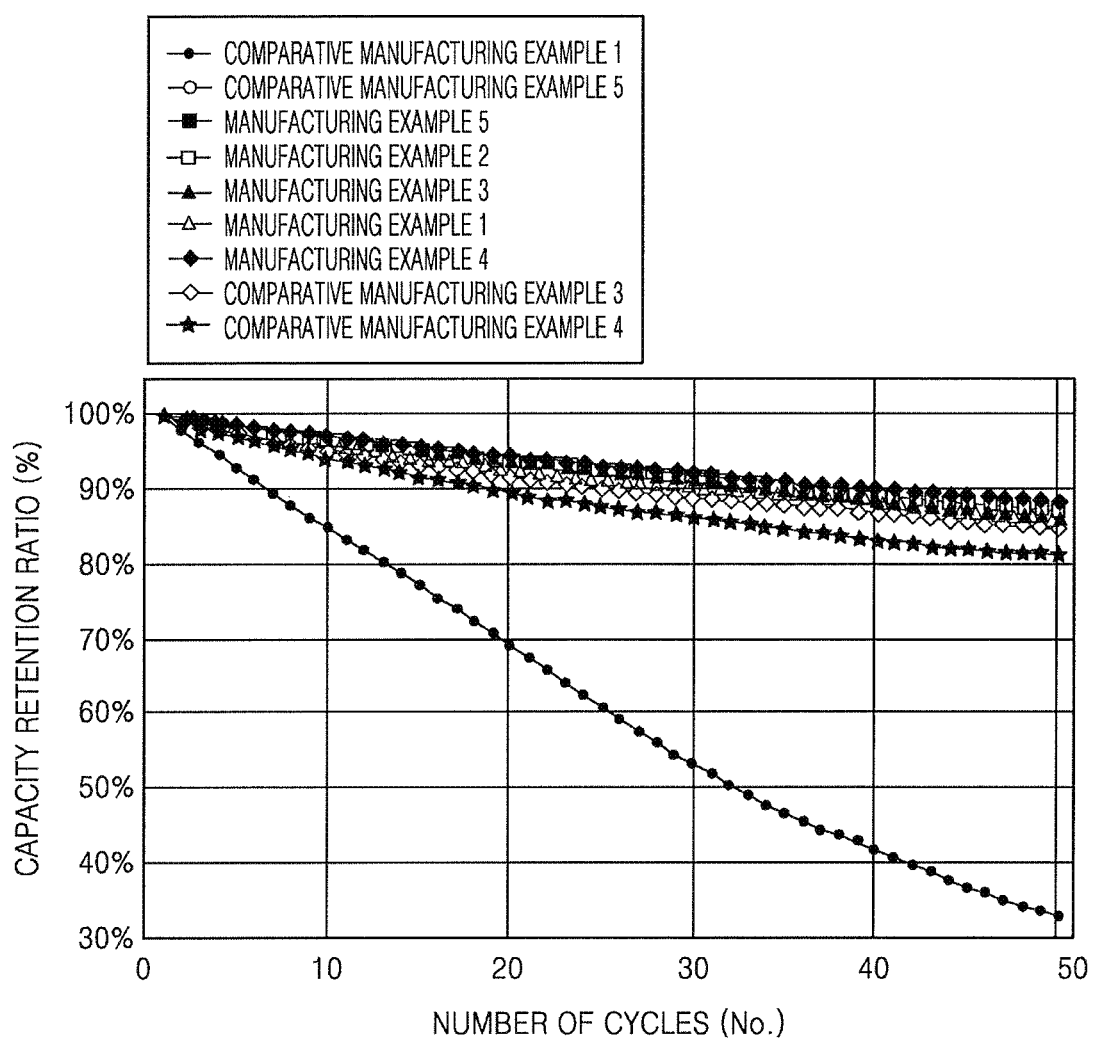
FIG. 5 illustrates lifespan characteristics for each lithium secondary battery prepared in Manufacturing Examples 1 to 5 and Comparative Manufacturing Examples 1, 3 to 5.

The results of the lifespan evaluation are shown in FIG. 5.

As shown in FIG. 5, it may be seen that the lithium secondary batteries prepared in Manufacturing Examples 1 to 5 had excellent lifespan characteristics.

Evaluation Example 4: X-Ray Diffraction Analysis

X-ray diffraction analysis was performed on the lithium cobalt composite oxides prepared in Examples 2 and 4 and the lithium cobalt composite oxides prepared in Comparative Examples 1, 3, 4, and 6 using X'pert pro (PANalytical) with CuKα radiation (1.54056 Å).

The results of the X-ray diffraction analysis are shown in Table 1.

The lattice constants a, c, and υ were obtained using a least square fitting method.

TABLE 1

| | Lattice constant | | | |
|---|---|---|---|---|
| | a (Å) | c (Å) | υ (Å³) | Lattice constant c/a |
| Comparative Example 1 | 2.8149 | 14.0467 | 96.39 | 4.990 |
| Example 2 (Mg: 0.5 mol %) | 2.8147 | 14.0497 | 96.40 | 4.992 |
| Example 4 (Mg: 1 mol %) | 2.8145 | 14.0510 | 96.39 | 4.992 |
| Comparative Example 3 (Mg: 2 mol %) | 2.8149 | 14.0511 | 96.42 | 4.991 |
| Comparative Example 4 (Mg: 3 mol %) | 2.8151 | 14.0529 | 96.45 | 4.992 |
| Comparative Example 6 (Mg: 5 mol %) | 2.8175 | 14.0531 | 96.54 | 4.988 |

As shown in Table 1, when the magnesium doping amount increased, the lattice constant a was maintained at a similar value, but a numerical value of the lattice constant c increased. In this regard, it may be seen that the lithium cobalt composite oxides prepared in Examples 2 and 4 and Comparative Examples 3 and 4 (when an amount of magnesium is 3 mol % or less) had magnesium doped in a $Li^+$ site instead of a $Co^{+3}$ site.

By way of summation and review, a substance mainly used as a positive electrode active material in lithium secondary batteries is lithium cobalt oxide ($LiCoO_2$). As the scope of use of lithium secondary batteries has widened beyond mobile information technology (IT) devices to being used in industries related to electronic tools and automobiles, demand for safe lithium secondary batteries with high capacity and high output has increased. In this regard, due to a capacity limit and safety of $LiCoO_2$, studies aimed at improving performance of $LiCoO_2$ are ongoing.

As described above, according to one or more example embodiments, the lithium cobalt composite oxide may help effectively suppress a phase transition at a high voltage, and thus stability of a lithium secondary battery including the lithium cobalt composite oxide may improve at a high voltage. Thus, when the lithium cobalt composite oxide is used, a lithium secondary battery having improved charge/discharge and lifespan characteristics may be manufactured.

The embodiments may provide a lithium secondary battery including the lithium cobalt composite oxide and having improved stability and improved cell performance at a high voltage.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A lithium cobalt composite oxide for a lithium secondary battery, the lithium cobalt composite oxide being doped with magnesium and having an atomic ratio of Mg/Co of the lithium cobalt composite oxide of about 0.005:1 to about 0.0075:1,
    wherein the lithium cobalt composite oxide is a compound represented by Formula 1:

$$Li_{1-x}Mg_xCo_{1-y}M_yO_2 \quad \text{[Formula 1]}$$

wherein, in Formula 1,
    0.005<x<0.007653 and 0≤y<0.02; and
    M is titanium (Ti), vanadium (V), nickel (Ni), iron (Fe), niobium (Nb), aluminum (Al), zirconium (Zr), or manganese (Mn).

2. The lithium cobalt composite oxide as claimed in claim 1, wherein the lithium cobalt composite oxide is $Li_{0.9925}Mg_{0.0075}CoO_2$, or $Li_{0.995}Mg_{0.005}CoO_2$.

3. A lithium secondary battery comprising a positive electrode that includes a lithium cobalt composite oxide, the lithium cobalt composite oxide being doped with magnesium and having an atomic ratio of Mg/Co of about 0.005:1 to about 0.0075:1,
    wherein the lithium cobalt composite oxide is a compound represented by Formula 1:

$$Li_{1-x}Mg_xCo_{1-y}M_yO_2 \quad \text{[Formula 1]}$$

wherein, in Formula 1,
    0.005<x<0.007653 and 0≤y<0.02; and
    M is titanium (Ti), vanadium (V), nickel (Ni), iron (Fe), niobium (Nb), aluminum (Al), zirconium (Zr), or manganese (Mn).

4. The lithium secondary battery as claimed in claim 3, wherein a charging voltage of the lithium secondary battery is 4.5 V or higher.

5. The lithium secondary battery as claimed in claim 3, wherein the lithium cobalt composite oxide is $Li_{0.9925}Mg_{0.0075}CoO_2$, $Li_{0.995}Mg_{0.005}CoO_2$, or $Li_{0.99325}Mg_{0.00625}CoO_2$.

* * * * *